Patented Jan. 16, 1945

2,367,632

UNITED STATES PATENT OFFICE 2,367,632

CARBALKOXYLATION OF ORGANIC COMPOUNDS

Vernon H. Wallingford, Ferguson, and August H. Homeyer, St. Louis, Mo., assignors to Mallinckrodt Chemical Works, St. Louis, Mo., a corporation of Missouri No Drawing. Application July 30, 1942, Serial No. 452,916

12 Claims. (Cl. 260—485)

This invention relates to the carbalkoxylation of organic compounds, and, with respect to certain more specific features, to the introduction of carbalkoxy groups into certain types of organic compounds containing multiple bonds.

This application is a continuation-in-part of our copending applications Serial No. 287,001, filed July 28, 1939; Serial No. 374,254, filed January 13, 1941; Serial No. 375,614, filed January 23, 1941; and Serial No. 379,828, filed February 20, 1941.

Among the several objects of the invention may be noted the provision of a general process for bringing about a carbalkoxylation of the type indicated, which is characterized by high yields, its inexpensive and readily procurable reaction materials, and the facility with which it may be carried out. Other objects will be in part obvious and in part pointed out hereinafter.

The invention accordingly comprises the steps and sequence of steps, and features of synthesis, analysis, or metathesis, which will be exemplified in the processes and products hereinafter described, and the scope of the application of which will be indicated in the following claims.

While the process of the present invention provides primarily for the introduction of a carbalkoxy group into compounds of the type above indicated, it also, in many instances, produces the carbalkoxylated product in the form of a highly reactive metallo derivative which readily lends itself to further steps of synthesis. This metallo compound may be then directly alkylated by the well-known procedures, or if carbalkoxylation alone is desired, the metallo group may be replaced by hydrogen in the usual fashion. The metal of such a group is usually and preferably one of the alkali metals.

Broadly speaking, the process of the present invention comprises the carbalkoxylation of organic compounds of the type subsequently described through the reaction of such a compound, a dialkyl carbonate, and a metal alcoholate, in the dialkyl carbonate, preferably in substantial excess, as the reaction medium. This may be represented by the following equation:

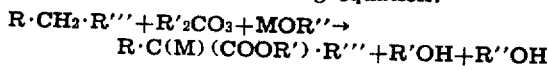

where R is selected from hydrogen and organic radicals which do not possess an aliphatic multiply bonded carbon atom adjacent to the $CH_2$ group, R''' is an organic radical attached to the $CH_2$ group by a carbon atom which is multiply bonded to an atom other than carbon and is not part of an aliphatic conjugated system, R' is the alkyl of the dialkyl carbonate, M is an alkali metal and R'' is the radical of the alcoholate. Where R and R''' are organic radicals they are preferably non-acidic in character.

While the reaction is preferably carried out with a symmetrical dialkyl carbonate as shown in the equation, it can be carried out with an unsymmetrical dialkyl carbonate. In such cases, a mixture of carbalkoxylated compounds and product alcohols may be formed.

The mechanism of the reaction involved in the process of the present invention has not yet been definitely established. The large excess of dialkyl carbonate which is preferred, appears, however, to be an important factor.

The reaction may be pushed to substantial completion by heating as it progresses, to distill off the product alcohols (R'OH and R''OH in the above equation). In case the original metal alcoholate contains alcohol, such alcohol is likewise removed by this distillation procedure. This procedure, while somewhat optional, is highly advantageous in its improvement in the yield of carbalkoxylated compound obtained.

When the intended use of the sodio or other alkali metal compound is the preparation therefrom of an alkyl substituted compound, the sodio compound need not be recovered from the residue as such, but the residue may be alkylated to form the alkylated compound which may then be recovered from the reaction mixture. On the other hand, if carbalkoxylation alone is desired, the sodio group, for example, may be replaced by hydrogen by any suitable method, for example, by acidification.

The following examples illustrate certain specific embodiments of the present invention, but are intended to be by way of example only:

EXAMPLE 1

Ethyl phenylacetate

Diethyl carbonate (450 ml.) was placed in a 1 liter, three-necked flask fitted with a mechanical stirrer. Solid alcohol-free sodium methylate (43 g.) and ethyl phenylacetate (123 g.) were added. The mixture became yellow and there was a little heat of reaction. By warming gently, all of the sodium methylate was brought into solution. The flask was attached to a fractionating column arranged for distillation at 175 mm. pressure. Alcohol was obtained as distillate at first, and then the temperature rose to 72° C. at 175 mm. at the head of the column, which corresponds approximately to the boiling point of diethyl carbonate. The residue in the flask consisted principally of the desired sodium derivative of phenylmalonic ester with an excess of diethyl carbonate.

The sodium derivative may be alkylated as follows: After cooling the reaction mixture, ethyl bromide (100 g.) was added and the flask was heated slowly to about 90° C. and maintained at that temperature for four hours. A solid (sodium bromide) separated from the solution. After cooling, the reaction mixture was acidified with acetic acid and agitated with ice water. The water layer was separated and extracted with a little ether. The organic layers were combined, washed with water, dried over calcium chloride and distilled, yielding recovered diethyl carbonate (300 g.) and phenylethylmalonic ester (166.6 g.) boiling between 130° C. at 30 mm. and 142° C. at 4 mm. Assuming the product to be pure phenylethylmalonic ester the yield based on ethyl phenylacetate was about 84% of the theoretical. The identity and purity of the product phenylethylmalonic ester was established by condensing a sample of it with urea. A high yield of phenobarbital, melting at 175-176° C., was obtained. The yield and purity of the phenobarbital was as good as is usually obtained from pure diethyl phenylethylmalonate made by other methods.

Carrying out the above carbalkoxylation without the simultaneous removal, by distillation, of the alcohols produced in the reaction, is entirely feasible, but the yield is somewhat decreased.

Example 2

Ethyl phenylacetate

Sodium ethylate substantially free of alcohol was prepared as follows: Sodium (18 g.) was dissolved in anhydrous ethyl alcohol (350 ml.) in a 1 liter, three-necked flask; the flask was arranged for distillation and heated by an oil bath until no more alcohol distilled when the temperature of the bath was 165° C. After cooling, the sodium ethylate remained as a solid cake containing alcohol of crystallization. Diethyl carbonate (450 ml.) and ethyl phenylacetate (123 g.) were added to the cooled sodium ethylate and the reaction mixture was stirred and warmed to about 60° C. for one hour during which the solid dissolved. The flask was connected to a fractionating column and alcohol was distilled at 150 mm. pressure. Alcohol was collected at 42-45° C. at 150 mm., and then the temperature at the head of the column rose rapidly to 74° C. at 150 mm., which corresponds approximately to the boiling point of diethyl carbonate. The formation of no more alcohol after arriving at this state showed that the carbalkoxylation reaction had been completed. The reaction mixture was cooled, acidified with acetic acid (47 ml.) and agitated with ice water. The water layer was separated and extracted with a little ether. The organic layers were combined, washed with water, dried over calcium chloride and distilled until all diethyl carbonate had been removed. The residue was distilled from a Claisen flask at reduced pressure, yielding recovered ethyl phenylacetate (8 g.) and substantially pure diethyl phenylmalonate (134 g.), boiling point 129-130° C., at 2 mm. The yield of diethyl phenylmalonate was 75% of the theoretical based on ethyl phenylacetate introduced into the reaction.

The foregoing and subsequent examples may be carried out, if desired, by placing the dialkyl carbonate and the ester in a flask under a reflux, and then gradually dropping in the metal alcoholate, which is preferably dissolved in alcohol. Simultaneously the alcohol is preferably taken off as a distillate at the head of the column.

If desired, the reactions described herein may be carried out at atmospheric pressure, rather than under reduced pressure. The selection of operating pressures is determined merely by manipulative convenience, in most instances.

Example 3

Methyl phenylacetate

Into a 500 ml. flask equipped with a stirrer were placed dimethyl carbonate (150 ml.), alcohol-free sodium methylate (19 g.), and methyl phenylacetate (50 g.). The mixture was stirred and warmed at 50 to 60° C. for two hours, and then the flask was attached to a distillation column and fractionated at 350 mm. pressure, until the boiling point of the product was 65° C., and a sample was insoluble in water. This showed that all the methyl alcohol formed by the reaction had been removed. Acetic acid (25 ml.) and ice water (150 ml.) were added, and the mass was agitated thoroughly. The organic layer was separated and distilled through a fractionating column, obtaining at first dimethyl carbonate, boiling at 90° C. at atmospheric pressure, and recovered methyl phenylacetate (16 g.) boiling at 84° C. at 4 mm. and finally, dimethyl phenylmalonate (39 g.), which distilled at about 122° C. at 3 mm. pressure. The melting point of the dimethyl phenylmalonate produced was 47 to 48° C. The dimethyl phenylmalonate produced represented a yield of 84% of the theoretical, based upon the amount of methyl phenylacetate not recovered.

Example 4

Propyl phenylacetate

Potassium metal (10 g.) was dissolved in anhydrous n-propyl alcohol (100 ml.) and distilled until no more alcohol was removed when heated at 100° C. and 35 mm. pressure. After cooling, di-n-propyl carbonate (200 g.) and n-propyl phenylacetate (45 g.) were added. After stirring for about an hour, the flask was attached to a fractionating column and distilled under a pressure of 100 mm. until no more propyl alcohol, boiling at 53° C., was obtained as distillate, and the temperature rose quickly to 99° C., the boiling point of dipropyl carbonate at 100 mm. After cooling the reaction mixture, it was acidified with acetic acid (17 ml.), and agitated with ice water. The organic layer was separated and fractionated at reduced pressure. At first dipropyl carbonate was obtained, then propyl phenylacetate (13 g.), distilling at 95 to 110° C. at 5 mm. pressure, and finally di-n-propyl phenylmalonate (38.2 g.) distilling at 146 to 148° C. at 4 mm. pressure. The yield of di-n-propyl phenylmalonate was 80%, based upon the acetate consumed.

Example 5

Ethyl p-methylphenylacetate

Sodium (5.6 g.) was added to anhydrous ethyl alcohol (150 ml.) in a 500 ml. three-necked flask attached to a fractionating column. When the reaction was complete the flask was heated by an oil bath until no more alcohol distilled when the temperature of the bath was 120° C. and the pressure was 20 mm. After cooling, the sodium ethylate remained as a solid cake containing alcohol of crystallization. The cake was mechanically broken up and diethyl carbonate (250 ml.) was added. The flask was arranged with a stirrer and the remaining alcohol was fractionated out at 150 mm. pressure and a bath temperature of 100° C.

The resulting alcohol-free suspension of sodium ethylate in diethyl carbonate was cooled to 25° C. Ethyl p-methylphenylacetate (44 g.) was added over one-half hour. The mixture was heated to 90° C. and alcohol (45 ml.) was fractionated out over 2.5 hours at a pressure of 150 mm. The mixture was then cooled and decomposed with acetic acid and water. The organic layer was separated, washed free of acid, dried and then fractionated. A yield of 65% (43 g.) of diethyl p-methylphenylmalonate, boiling point 124–125° C. at 1–2 mm., and $n$ 20/D 1.4930, was obtained. The ester was identified by converting it by alkaline hydrolysis to the known p-methylphenylmalonic acid, melting at 142–143° C.

Example 6

*Ethyl p-iodophenylacetate*

A mixture of sodium ethylate (¼ mol) and diethyl carbonate (250 ml.) was prepared as in Example 5. Then at 20° C., ethyl p-iodophenylacetate (72 g.) was added. The mixture was heated to 90° C. at a pressure of 150 mm. and alcohol (30 ml.) was fractionated out at 35–40° C. over a period of one hour. After another 15 ml. of distillate was taken off the temperature of the distillate was 70° C. showing that all the alcohol formed had been removed. The mixture was worked up as in Example 5 and a yield of 61% (55 g.) of diethyl p-iodophenylmalonate was obtained boiling at 165° C. at 1.5 mm. and having an index of refraction of $n$ 20/D 1.5432 to 1.5438. The equivalent saponification of this material was found to be 181, which is the theoretical value for this ester. The compound was analyzed and found to contain 42.8% carbon and 4.1% hydrogen. Theory: Carbon 43.1%, hydrogen 4.1%.

Example 7

*Ethyl homoveratrate*

A mixture of sodium ethylate (¼ mol) and diethyl carbonate (250 ml.) was prepared as in Example 5. Ethyl homoveratrate (56 g.) was then added to the mixture at room temperature and at atmospheric pressure during fifteen minutes. Most of the sodium ethylate went into solution and the latter became colored brown. The pressure was then reduced to 150 mm., the bath temperature was raised to 90–100° C., and 50 ml. of distillate was fractionated out at 30–50° C. within 1.5 hours. Then no more alcohol was formed and the distilling temperature rose to 70° C. The mixture was cooled with an ice water bath to around 20° C. and worked up as in Example 5. There was obtained a 68% (45 g.) yield of diethyl 3,4-dimethoxyphenylmalonate of boiling point 169–170° C. at 1 mm. and index of refraction, $n$ 20/D 1.5072–1.5080. The theoretical saponification equivalent is 148 and that found was 149. The compound was analyzed and found to contain 60.9% carbon and 6.9% hydrogen. Theory: Carbon 60.8%, hydrogen 6.7%.

Example 8

*Ethyl α-naphthylacetate*

Sodium ethylate was prepared by dissolving sodium (1.4 g.) in anhydrous alcohol (50 ml.), and the solution was distilled to dryness and heated at 100° C. under 35 mm. pressure until no more alcohol could be removed. After cooling the residue, a solution of ethyl α-naphthylacetate (10 g.) in diethyl carbonate (150 ml.) was added. The reaction mixture was stirred and warmed until it refluxed under a packed column at 200 mm. pressure. Alcohol was removed as distillate from the head of the column, 15 ml. being obtained at 50 to 55° C. under 200 mm. pressure. The temperature then rose of 84° C. under 200 mm. pressure, which corresponds approximately to the boiling point of diethyl carbonate. The reaction mixture was cooled and poured onto ice and acetic acid (5 ml.), and the organic layer was separated and washed with water. After the solvent was distilled off until no more distillate was obtained at 35 mm. pressure and a bath temperature of 100° C., there remained 13 g. of an oil as residue. Addition of petroleum ether caused the residue to crystallize, and the solid was filtered and washed with petroleum ether. It was dissolved in a little anhydrous alcohol and crystallized by the addition of petroleum ether. The crystals obtained melted at 59 to 60° C. These were diethyl α-naphthylmalonate. The yield was 67%.

Example 9

*Ethyl β-phenylpropionate*

Sodium ethylate substantially free of alcohol was prepared from 8 g. of sodium, as described in Example 2. Diethyl carbonate (250 ml.) and ethyl β-phenylpropionate (60 g.) were added to the cooled sodium ethylate. The flask was connected to a fractionating column and the reaction mixture was stirred and heated. Alcohol (70 ml.) boiling at 70–80° C. was obtained as distillate in five hours. After cooling the reaction mixture was acidified with acetic acid (25 ml.) and agitated with ice water. The organic layer was separated, washed with water, dried and distilled. After the diethyl carbonate had been removed, diethyl benzylmalonate (55.6 g.), boiling at about 105° C. at 1 mm., was obtained. The index of refraction of the product was about $n$ 26.5/D, 1.484.

The identity of the product was proved by converting it to benzylmalondiamide by shaking a portion of the distillate (2 ml.) with concentrated ammonia water (5 ml.) and keeping over night. On the following day the needles which had separated were filtered off, washed with ether and water and dried. The benzylmalondiamide melted at 229–230° C.

Example 10

*Ethyl acetate*

A mixture was made of sodium ethylate (½ mol) and diethyl carbonate (250 ml.) as in Example 5. The flask containing the mixture was arranged with a stirrer and a reflux condenser. The mixture was stirred and heated at 115–125° C. and ethyl acetate (44 g.) was added during one hour. The mixture was then stirred and refluxed one hour at a bath temperature of 120–125° C. Then 55 ml. of distillate was fractionated out during 1.5 hours at 70–80° C. Then the distilling temperature rose rapidly to 90° C. The mixture was cooled and worked up as in Example 5. There were obtained a 30% (26 g.) yield of diethyl malonate, boiling point 100–105° C. at 27 mm. and index of refraction $n$ 25.5/D 1.4110–1.4113, and a 10% (10 g.) yield of tricarbethoxymethane, boiling point 123° C. at 6 mm. and index of refraction $n$ 25.5/D 1.4227, and melting point 24–26° C. The diethyl malonate was identified by preparing from it malondiamide of melting point 172–174° C.

EXAMPLE 11

Ethyl butyrate

A mixture was made of sodium ethylate (½ mol) and diethyl carbonate (250 ml.) as in Example 5. The mixture was heated to a bath temperature of 130° C. and stirred, and ethyl butyrate (58 g.) was added over a period of one hour. The bath temperature was then raised to 145–150° C. and during 4.5 hours 50 ml. of ethyl alcohol was fractionated out. The product was worked up as in Example 5. There was obtained a yield of 44% (41 g.) of diethyl ethylmalonate, boiling at 94–96° C. at 13 mm. pressure and having an index of refraction of $n$ 20/D 1.4170.

There was also obtained a 10% (9 g.) yield of diethyl diethylmalonate. The total product yield was about 55%. It will be noted that in this instance, as in several examples subsequently, diethyl carbonate apparently acts as an ethylating agent, as well as taking part in the carbalkoxylation.

The diethyl ethylmalonate was identified by hydrolyzing it to give ethylmalonic acid, melting at 111–113° C. The diethyl diethylmalonate was identified by hydrolyzing it to give diethylmalonic acid, melting at 126–128° C.

EXAMPLE 12

Ethyl caproate

A mixture was made of sodium ethylate (½ mol) and diethyl carbonate (400 ml.) as in Example 5. This mixture was stirred and heated to a bath temperature of 150–155° C. and ethyl caproate (72 g.) was added during ½ hour. Then, during three hours, ethyl alcohol (55 ml.) was fractionated out at atmospheric pressure. The mixture was cooled and worked up as in Example 5. There were obtained a yield of 26% (27 g.) of diethyl butylmalonate, boiling at 136–137° C. at 21 mm. and having an index of refraction, $n$ 20/D 1.4250, and a yield of 34% (41 g.) of diethyl ethylbutylmalonate, boiling at 124° C. at 12 mm. and having an index of refraction of $n$ 20/D 1.4280. The esters were identified by hydrolysis to the corresponding malonic acids.

EXAMPLE 13

Ethyl stearate

Sodium ethylate substantially free of alcohol was prepared from 2.4 g. of sodium, as described in Example 2. Diethyl carbonate (150 ml.) and ethyl stearate (31 g.) were added to the cooled sodium ethylate and the reaction mixture was stirred and refluxed under a column at 250 mm. pressure for ¾ hour. Then the reaction mixture was refluxed at atmospheric pressure and alcohol (9.1 g.) was obtained as distillate during three hours. The temperature at the head of the column rose to 125° C., the boiling point of diethyl carbonate, and no more alcohol could be obtained. The excess diethyl carbonate was distilled off as completely as possible at reduced pressure leaving a waxy solid. The residue was agitated with ether, acetic acid (10 ml.) and water, and the organic layer was separated, washed and dried. Evaporation of the ether gave 40 g. of an oil which solidified at about 10° C. This was distilled yielding diethyl cetylmalonate (27.8 g.), boiling at 185–190° C. at 1 mm. The identity of the product was proved by hydrolyzing it to cetylmalonic acid. A portion of the distillate (11 g.) was refluxed for three hours with potassium hydroxide (8 g.) in alcohol (100 ml.). The alcohol was evaporated and the residue was dissolved in water and acidified with hydrochloric acid. The oil was extracted with ether and the extract was evaporated to dryness. The residue was recrystallized from acetic acid and washed with petroleum ether. The cetylmalonic acid melted at 117–120° C.

EXAMPLE 14

Butyl stearate

Potassium metal (20 g.) was dissolved in n-butyl alcohol (200 cc.) in a 1 liter, three-necked flask. The flask was arranged for distillation at reduced pressure and heated by an oil bath until no more distillate was obtained when the temperature of the bath was about 130° C., and the pressure was about 30 mm. After cooling, the potassium butylate remained as a solid cake containing some butyl alcohol of crystallization. Di-n-butyl carbonate (435 g.) and butyl stearate (170 g.) were added. The flask was fitted with a mechanical stirrer and attached to a fractionating column. Butyl alcohol was fractionated out of the reaction mixture at 54–60° C. at 50 mm. pressure. When no more butyl alcohol was obtainable as distillate the reaction mixture was cooled and poured onto ice and acetic acid (35 cc.). The organic layer was separated and distilled through a column at reduced pressure until all dibutylcarbonate had been removed. The residue was distilled from a Claisen flask at reduced pressure. Dibutyl cetylmalonate (123 g.) was obtained, boiling at about 206–215° C. at 2 mm., $n$ 26/D 1.4432–1.4441.

EXAMPLE 15

Ethyl iso-valerate

A mixture of sodium ethylate (0.4 mol) and diethyl carbonate (300 ml.) was made up as in Example 5. The mixture was stirred and ethyl iso-valerate (52 g.) was added. Then, during twelve hours, 25 ml. of distillate, mostly ethyl alcohol, was fractionated out at atmospheric pressure and a bath temperature of 170–175° C. The mixture was cooled and worked up, as described in Example 5. There were obtained yields of 30% (26 g.) of diethyl iso-propyl-malonate, boiling at 106–109° C. at 18 mm. and having an index of refraction of $n$ 21.5/D 1.4186–1.4190, and 10% (7 g.) of diethyl ethyl-iso-propyl-malonate of boiling point 114° C. at 18 mm. and having an index of refraction of $n$ 21.5/D 1.4282–1.4300. The diethyl iso-propylmalonate was identified by hydrolyzing it to iso-propylmalonic acid, melting at 88–90° C. The diethyl ethyl-iso-propylmalonate was identified by hydrolyzing it to ethyl-iso-propylmalonic acid, melting at 132–134° C.

EXAMPLE 16

Ethyl iso-amylacetate

A mixture of sodium ethylate (0.28 mol) and diethyl carbonate (250 ml.) was prepared as in Example 5, and ethyl iso-amylacetate (45 g.) was added. The mixture was stirred at a bath temperature of 155-160° C. During three hours, 33 ml. of ethyl alcohol was fractionated out, and the mixture was then refluxed for three hours longer. It was worked up in the manner described in Example 5. Yields of 25% (15 g.) of diethyl iso-amylmalonate, of boiling point 130° C. at 16 mm., and of 45% (30 g.) of diethyl iso-amylethylmalonate, boiling point 135° C. at 16 mm., were obtained. The diethyl iso-amylmalonate was identified by hydrolyzing it to iso-amylmalonic acid, which melted at 100-102° C. The diethyl iso-amylethylmalonate was identified by hydrolyzing it to ethyl-iso-amylmalonic acid, which melted at 120-121° C.

Example 17

Butyl laurate

Potassium metal (15 g.) was dissolved in n-butyl alcohol (100 ml.) and the solution was distilled to dryness at reduced pressure. Dibutyl carbonate (350 ml.) and butyl laurate (77 g.) were added to the cooled residue. Butyl alcohol was fractionated out of the reaction mixture according to the procedure described in Example 14, a total of 88 g. of distillate being obtained in three hours, boiling at 47-104° C. at 25 mm. The reaction mixture was cooled and poured onto ice and acetic acid (25 ml.) and the organic layer was separated, washed and dried. After distilling off the excess dibutyl carbonate there was obtained di-n-butyl decylmalonate (65.4 g.) boiling chiefly at 159-160° C. at 1.5 mm. The index of refraction of the product was $n$ 26.5/D, 1.4390. Its identity was proved by determination of the saponification equivalent: Found 179.3 and 180.9; calculated for $C_{21}H_{40}O_4$, 178.1.

Example 18

Ethyl laurate

Sodium ethylate was made by dissolving sodium metal (7.5 g.) in anhydrous alcohol (150 ml.) and distilling the mixture to dryness. After cooling, dry diethyl carbonate (300 ml.) and ethyl laurate (68 g.) were added. The reactants were stirred and refluxed under a packed column at 200 mm. pressure, and alcohol was removed as distillate. After two hours, very little more alcohol was obtained, and the mixture was refluxed at atmospheric pressure for two hours more. After cooling the mixture was acidified with acetic acid (20 ml.), and shaken with water. The organic layer was washed, dried and distilled. After removing the diethyl carbonate, diethyl decylmalonate (45 g.) was obtained.

The product distilled at about 130-132° C. at 1.5 mm., and its index of refraction was $n$ 26/D, 1.4341. Its identity was further established by converting it to the free acid. The product was hydrolyzed by refluxing for three hours with potassium hydroxide (25 g.) dissolved in alcohol (200 ml.). The alcohol was evaporated, the residue was dissolved in water and decylmalonic acid was precipitated by adding excess hydrochloric acid. After recrystallizing from a mixture of chloroform and petroleum ether it melted at 118-119.5° C. The neutral equivalent found was 122.2 and calculated for $C_{13}H_{24}O_4$ is 122.1.

Example 19

Ethyl oleate

Sodium ethylate substantially free of alcohol was prepared from 8.5 g. of sodium, as described in Example 2. Diethyl carbonate (450 ml.) and ethyl oleate (93 g.) were added to the cooled sodium ethylate. The ethyl oleate was prepared by esterification of oleic acid U. S. P. and was not quite pure, as shown by its saponification equivalent being 327, compared to the theoretical of 310. The reactants were stirred and refluxed under a pressure of 200 mm. for two hours and then distilled through a column at atmospheric pressure until no more alcohol could be obtained. The reaction mixture was cooled and agitated with excess acetic acid and ice water and the organic layer was separated, washed with water and dried. After removing the diethyl carbonate by distillation diethyl hexadecenylmalonate was obtained, boiling at about 190° C. at 1.5 mm. The composition of the product was shown to be substantially diethyl hexadecenylmalonate by determination of its saponification equivalent: found 210; calculated 191.

Example 20

Ethyl sebacate

Sodium (9.6 g.) was dissolved in ethyl alcohol (200 ml.), and the mixture distilled to dryness. The sodium ethylate remaining as residue was 44.2 g. After cooling, diethyl carbonate (200 ml.) and ethyl sebacate (50 g.) were added, and the mixture was stirred and heated under a packed column at 150 mm. pressure. Alcohol (21 g.), boiling at 42 to 44° C. at 150 mm. pressure were removed as distillate during two hours, and then the reaction mixture was heated at atmospheric pressure, and 23 g. more distillate were obtained in the following two hours. After cooling, the reaction mixture was acidified with acetic acid (25 ml.), and poured onto ice. The organic layer was separated, washed and distilled. After all the solvent had been removed, the residue weighed 67 g. The oil was distilled from a Claisen flask and 1,1,8-tricarbethoxyoctane, boiling at 185° C. under 1.5 mm. pressure, with some decomposition, was obtained. The composition of the product was established by determining its saponificaton equivalent; found 111.4; calculated for $C_{17}H_{30}O_6$, 110.

Example 21

Acetophenone

SODIUM ETHYLATE AND DIETHYL CARBONATE

Sodium (4.6 g.) was added to anhydrous ethyl alcohol (100 ml.) in a 500 ml., three-necked flask arranged with a sealed stirrer, an oil bath, and a fractionating column. After the reaction was complete the excess alcohol was vacuum distilled out until only 8.5 g. of alcohol remined. The mixture was cooled and diethyl carbonate (125 ml.) was added. The cake of sodium ethylate was broken up by stirring until an even suspension resulted.

The mixture was stirred and cooled to 10° C. and acetophenone (24 g.) was added slowly during twenty minutes. The temperature was kept below 15° C. with an ice-water bath. Then the mixture was stirred at 15-20° C. for fifteen minutes and then at 40-50° C. for ten minutes. The alcohol present was then fractionally distilled out at 120 mm. and a bath temperature of 100° C. during 1.5 hours. The mixture was then cooled and decomposed with acetic acid and water. The oil was washed free of acid with water, dried, and fractionated. There was obtained a 59% (22.5 g.) yield of ethyl benzoylacetate, boiling point 138-140° C. at 5-6 mm., $n$ 24/D 1.5251-

1.5264. This product was identified by reacting it with phenylhydrazine to produce 1,3-diphenyl-pyrazolone-5, which melted at 137–138° C.

Example 22

Acetophenone

POTASSIUM BUTYLATE AND DIBUTYL CARBONATE

Potassium (40 g.) was dissolved in n-butyl alcohol (300 ml.) and distilled to dryness. The residue was heated at 120° C. and 30 mm. pressure until the potassium butylate was substantially free of alcohol. After cooling, di-n-butyl carbonate (700 ml.) was added and the reaction flask was fitted with a stirrer, dropping funnel and fractionating column arranged for distillation at reduced pressure. The mixture in the flask was stirred at 25° C. while acetophenone (120 g.) was added from the dropping funnel during one hour. Then butyl alcohol was distilled out of the reaction mixture, the distillate being collected at about 40° C. at 18 mm. pressure.

The reaction mixture was cooled and agitated with acetic acid (70 ml.) and ice (400 g.). The organic layer was separated, washed, and distilled at reduced pressure. After removal of the excess dibutyl carbonate and low boiling material, the product, n-butyl benzoylacetate, distilled at about 120–125° C. at 1 mm., and its index of refraction was about $n$ 21/D 1.5161 to 1.5185. The yield was 106 g., or 48% of the theoretical based on acetophenone.

The identity of the product was established by converting a sample to 1,3-diphenylpyrazolone-5 by reaction with phenylhydrazine. The product was recrystallized from alcohol and melted at 136–137° C.

Example 23 p-Chloroacetophenone p-Chloroacetophenone (78 g.) and diethyl carbonate (500 ml.) were refluxed under a packed column at 150 mm. pressure, while a solution of sodium ethylate made from sodium metal (12 g.) and anhydrous alcohol (250 ml.) was added from a dropping funnel. Alcohol was distilled out simultaneously and when no more was obtainable as distillate, the reaction mixture was cooled, acidified with acetic acid (35 ml.) and agitated with ice water. The organic layer was separated, washed, dried, and distilled.

After removal of the excess diethyl carbonate, the product, ethyl p-chlorobenzoylacetate, distilled at about 123–125° C. at 2 mm. pressure. Its index of refraction was $n$ 21/D 1.5441 to 1.5475. The yield was 79.6 g., or 70% of the theoretical based on p-chloroacetophenone. A sample of the product was converted to the copper salt by dissolving in alcohol and adding a saturated solution of copper acetate until no more precipitate formed. The green copper salt was decomposed by shaking with ether and a solution of acetic acid, and the ether layer was washed free of copper salts. Evaporation of the solvent gave an oil which crystallized as large plates, and on recrystallization from 60% alcohol, gave a pure product melting at 37–40° C.

The identity of the product was established by converting a sample of it to 3-p-chlorophenyl-1-phenylpyrazolone-5. A sample of the purified ester (2.3 g.), phenylhydrazine (1.1 ml.), alcohol (2 ml.), and dilute hydrochloric acid (one drop), were heated together for one hour and the solid which formed was recrystallized from alcohol and sublimed in a high vacuum at about 140° C. It melted at 161° C. and analysis gave 13.2% chlorine compared to the theoretical calculated for $C_{15}H_{11}ON_2Cl$ of 13.1%.

Example 24 p-Methylacetophenone

Potassium metal (13 g.) was dissolved in n-propyl alcohol (100 ml.) in a 500 ml. three-necked flask and the excess alcohol was distilled off. The residue was heated at 100° C. and 30 mm. pressure until the potassium propylate was substantially free of alcohol. After cooling, di-n-propyl carbonate (250 ml.) was added to the residue and the flask was fitted with a mechanical stirrer, dropping funnel and fractionating column arranged for distillation at reduced pressure. The mixture in the flask was brought to refluxing under a pressure of 100 mm. and a solution of p-methylacetophenone (45 g.) in propyl carbonate (50 ml.) was added from the dropping funnel during one hour, while propyl alcohol was obtained simultaneously as distillate at the head of the column, boiling at about 47–51° C. at 100 mm. When no more propyl alcohol was obtainable as distillate the reaction mixture was cooled and agitated with ice and acetic acid. The organic layer was separated, washed free of acid, dried, and fractionated. After removing the excess dipropyl carbonate, the product, n-propyl p-methylbenzoylacetate, distilled at 130–135° C. at 2 mm. pressure. Its index of refraction was about $n$ 20/D 1.5250. The yield was 47.8 g., or 66% of the theoretical based on p-methylacetophenone.

The identity of the product was established by converting a sample of it to 3-p-tolyl-isoxazolone-5 by reaction with hydroxylamine hydrochloride. The product melted at 131/133° C.

Example 25 p-Methoxyacetophenone

Sodium (12 g.) was dissolved in anhydrous ethyl alcohol (250 ml.) in a 1 liter, three-necked flask. The excess alcohol was distilled off and the residue was heated at 100° C. and a pressure of about 20 mm. until the sodium ethylate was substantially free of alcohol. After cooling, diethyl carbonate (400 ml.) was added and the flask was fitted to a fractionating column arranged for a distillation at reduced pressure and equipped with a mechanical stirrer and dropping funnel. The reaction mixture was refluxed under a pressure of 150 mm. and a solution of p-methoxyacetophenone (75 g.) in diethyl carbonate (100 ml.) was added gradually from the dropping funnel during 1¼ hours, and simultaneously alcohol was removed as distillate at the head of the column. When no more alcohol was obtainable as distillate the reaction mixture was cooled, acidified with acetic acid (35 ml.) and agitated with ice water. The organic layer was separated, dried over calcium chloride and distilled. After removal of the excess diethyl carbonate and some low boiling material, the product, ethyl p-methoxybenzoylacetate, distilled between 155° C. at 4.5 mm. and 147° C. at 2.5 mm. The yield was 55.8 g., or 50% of the theoretical based on p-methoxyacetophenone introduced.

The identity of the product was established by allowing a sample of it to react with hydroxylamine hydrochloride, yielding 3-(4-methoxyphenyl)-isoxazolone-5, which melted at 141–144° C.

Example 26 p-Ethoxyacetophenone

Diethyl carbonate (500 ml.) and p-ethoxyacetophenone (82 g.) were placed in a 1 liter, three-necked flask, fitted with a mechanical stirrer, dropping funnel and packed fractionating column. The reaction mixture was stirred, heated to refluxing, and a solution of sodium ethylate made from sodium (12 g.) and anhydrous ethyl alcohol (250 ml.) was added slowly from the dropping funnel, while alcohol was removed simultaneously as distillate at the head of the column. When no more alcohol was obtainable as distillate the reaction mixture was cooled and poured onto a mixture of ice and hydrochloric acid. The organic layer was separated, washed free of acid, dried over calcium chloride and distilled until all diethyl carbonate had been removed. Since the residue tended to decompose on heating under a pressure of 2 mm., the product was purified by means of its copper salt. The residue was mixed with alcohol (100 ml.) and treated with a saturated, aqueous solution of copper acetate until no more precipitate formed. The green solid was filtered off and washed with alcohol. It was decomposed with a solution of acetic acid in the presence of ether and the ether layer was washed with water until free of copper. Evaporation of the ether yielded an oil which solidified and was recrystallized from petroleum ether. The product, ethyl p-ethoxybenzoylacetate, melted at 50–53° C., and after sublimation of a sample in a high vacuum at 87° C., it melted at 53–54° C. The yield was 45 g., or 38% of the theoretical based on p-ethoxyacetophenone. Analysis of the product gave 66.2% carbon and 6.78% hydrogen, compared to the theoretical calculated for $C_{13}H_{16}O_4$ of 66.06% carbon and 6.83% hydrogen.

The identity of the product was further established by converting a sample to 3-(4-ethoxyphenyl)-isoxazolone-5 by reaction with hydroxylamine. A sample of the product (1 g.) was heated with hydroxylamine hydrochloride (1 g.), water (4 ml.), sodium acetate (2 g.), and alcohol (12 ml.). On cooling, a solid separated which was recrystallized twice from alcohol and dried. The 3-(4-ethoxyphenyl)-isoxazolone-5 melted at 135–136° C. and analysis for nitrogen gave 6.83 compared to the theoretical calculated for $C_{11}H_{11}O_3N$ of 6.82%.

3-(4-ethoxyphenyl)-1-phenylpyrazolone-5 was prepared by heating together a sample of the ester (2 g.), phenylhydrazine (2 ml.), alcohol (4 ml.) and dilute hydrochloric acid (one drop). A solid formed which was washed with 50% alcohol and recrystallized twice from alcohol. It melted at 152–153° C., and analysis for nitrogen gave 9.98% compared to the theoretical calculated for $C_{17}H_{16}O_2N_2$ of 10.0%.

Example 27

Propiophenone

Sodium (18 g.) was dissolved in anhydrous ethyl alcohol (350 ml.) and distilled to dryness. The residue was heated at 130° C. at 20 mm. pressure until the sodium ethylate was substantially free of alcohol. After cooling, diethyl carbonate (500 ml.) was added and the reaction mixture was stirred and warmed at about 60° C., while propiophenone (101 g.) was added slowly from a dropping funnel. The flask was attached to a fractionating column and alcohol was distilled out at a pressure of about 150 mm. When no more alcohol was obtainable the reaction mixture was cooled and agitated with ice and acetic acid. The organic layer was separated, washed, dried, and distilled. After all of the diethyl carbonate had been removed the residue weighed 133 g. and fractionation showed it to consist principally of two substances. A product boiling at about 96–105° C. at 1 mm. and having an index of refraction of n 25/D 1.496 was ethyl propiophenone-enol carbonate. A higher boiling fraction was proven to be ethyl alpha-benzoylpropionate. The latter product distilled at 115–118° C. at 1 mm. and the index of refraction was n 25/D 1.5070 to 1.5090. The yield was 56 g., or 37% of the theoretical. Its identity was established by converting a sample to 4-methyl-3-phenyl-isoxazolone-5. A portion of the ester (2 ml.) was combined with hydroxylamine hydrochloride (1.5 g.), sodium acetate (2.5 g.), water (5 ml.), and alcohol (15 ml.), and heated for one hour. Water (10 cc.) was added, the alcohol was boiled off, and the residue was extracted with ether. The ether extract was dried and evaporated and the residue was recrystallized from petroleum ether. The product melted at 122–124° C.

Example 28

Butyrophenone

Sodium (18 g.) was dissolved in ethyl alcohol (350 ml.) and distilled to dryness. The residue was heated at 130° C. at 20 mm. until the sodium ethylate was substantially free of alcohol. After cooling, diethyl carbonate (600 ml.) was added and stirred at about 70° C. while butyrophenone (111 g.) was added slowly from a dropping funnel. The reaction flask was attached to a fractionating column and as much alcohol as possible was distilled out under a pressure of about 150 mm. The reaction mixture was cooled and agitated with ice and excess hydrochloric acid. The organic layer was separated, washed, dried, and fractionated. After all the diethyl carbonate had been removed, the oily residue weighed 140 g. Fractionation gave two products. The material boiling at about 98–100° C. at 1.5 mm., n 21.5/D 1.489, was ethyl butyrophenone-enol carbonate.

The material distilling at 118–123° C. at 1.5 mm. was shown to be ethyl alpha-benzoylbutyrate by converting a sample to 4-ethyl-3-phenyl-isoxazolone-5. A sample of the ester (2 ml.) was combined with hydroxylamine hydrochloride (1.5 g.), sodium acetate (2 g.), water (5 ml.), and alcohol (10 ml.) and boiled. After most of the alcohol had been driven off, water was added and the oil was extracted with ether. The ether layer was dried, evaporated to a small volume, and the product was crystallized by adding petroleum ether. The derivative melted at 88–90° C.

Example 29

Desoxybenzoin

A mixture was made of sodium ethylate (13.6 g.), diethyl carbonate (100 ml.) and ethyl alcohol (14.5 g.), as described in Example 1. The mixture was stirred and cooled at 5° C. and a solution of desoxybenzoin (39.2 g.) in diethyl carbonate (50 ml.) was added during twenty minutes. The mixture was warmed to 50° C. and stirred for twenty minutes. Then the alcohol present was fractionally distilled off. After the bulk of the alcohol was distilled off rapidly it slowly continued to form and to be distilled out, and the operation was continued for a total of three hours at a bath temperature of 100° C. and a pressure of 120 mm. Then the mixture was cooled and decomposed with acetic acid and water. The organic layer was separated from the water layer and was washed free of acid with dilute sodium carbonate solution and water and dried and the diethyl carbonate was vacuum distilled out. From the residue there was obtained by crystallization a yield of 5% (2.5 g.) of ethyl phenylbenzoylacetate, which melted at 90–91° C.

EXAMPLE 30

*Dibenzyl ketone*

A mixture was made of sodium ethylate (13.6 g.), diethyl carbonate (125 ml.) and ethyl alcohol (8.5 g.), as described in Example 1. The mixture was stirred and cooled to 15° C. and dibenzyl ketone (42 g.) was added during twenty minutes. After fifteen minutes more stirring the bath was heated to a final temperature of 105° C. and, at 120 mm., all of the alcohol present (40 cc.) was fractionated out during two hours. The mixture was cooled and decomposed with acetic acid and water. The organic layer was washed free of acid with water and was then dried. The solvent was vacuum distilled off. From the residue there was obtained a yield of 46% (26 g.) of ethyl alpha, gamma-diphenylacetoacetate, melting point 77–79° C.

EXAMPLE 31

*Methyl beta-naphthyl ketone*

A mixture was made of sodium ethylate (13.6 g.), diethyl carbonate (100 ml.), and ethyl alcohol (95 g.), as described in Example 1. The mixture was cooled to 5° C. and stirred. During twenty minutes, at 5–10° C., a solution of methyl beta-naphthyl ketone (34 g.) in diethyl carbonate (50 ml.) was added. Then the mixture was heated to 30° C. for fifteen minutes. Then the bath was heated to 90–100° C. and, during ¾ hour, 36 ml. of alcohol was fractionally distilled out at 120 mm. The mixture was cooled and worked up as in Example 1. After the solvent was off there was obtained an oil. This oil was taken up in ethyl alcohol and a water solution of copper acetate was added until no more green precipitate formed. This precipitate, recrystallized from benzene, melted at 190–192° C. The solid was suspended in water and acetic acid was added with shaking. The oil which formed was extracted with ether. The ether solution was dried and the ether was evaporated off. From the residue there was obtained ethyl beta-naphthoylacetate, melting at 32–34° C. A phenylhydrazine derivative obtained from this ester melted at 117–118° C. The yield of the ester was 25%.

EXAMPLE 32

*Diethyl ketone*

Sodium (9.2 g.) was added to anhydrous ethyl alcohol (200 ml.) in a 500 ml. three-necked flask arranged with a sealed stirrer, an oil bath, and a fractionating column. After the reaction was complete the excess alcohol was vacuum distilled out until only 25 g. of alcohol remained. The mixture was cooled and diethyl carbonate (200 ml.) was added. The cake of sodium ethylate was broken up by stirring until an even suspension resulted. The mixture was stirred and cooled to 15° C. and diethyl ketone (34.4 g.) was added in ten minutes. The mixture was warmed to 30° C. and stirred for thirty minutes. The mixture was then warmed to 50–60° C. and stirred for one hour. All the alcohol present was then fractionally distilled out during 1.5 hours at 120 mm. and a bath temperature of 100° C. The mixture was cooled and decomposed with acetic acid and water. The oil was washed free of acid with water, dried, and fractionated. There was obtained a 20% (12.5 g.) yield of ethyl 2-methyl-3-keto-pentanoate, boiling point 103–106° C. at 32 mm. This product was identified by reacting it with phenylhydrazine to produce 4-methyl-3-ethyl-1-phenyl-pyrazolone-5, which melted at 111–112° C.

EXAMPLE 33

*Methyl isopropyl ketone*

Methyl isopropyl ketone (50 g.) and diethyl carbonate (300 ml.) were stirred mechanically in a 500 ml. three-necked flask and cooled to 2° C. Alcohol-free sodium methylate (29 g.) was made into a thick paste with diethyl carbonate and added slowly to the reaction mixture. After two hours the reaction mixture was warmed and as much alcohol as possible fractionated out under a pressure of 200 mm. After cooling, the reaction mixture was acidified with acetic acid, agitated with water, and the organic layer was separated and fractionated. After removal of the excess diethyl carbonate an ester fraction boiling at 70–81° C. at 10 mm. and weighing 21.6 g., was obtained. The product, dissolved in alcohol, gave a red color when treated with a little ferric chloride solution, indicating the presence of an enolic group. The product was identified as an ester of 4-methyl-3-keto-pentanoic acid by converting a sample to 3-isopropyl-1-phenylpyrazolone-5. A sample of the ester was treated with an equal volume of phenylhydrazine and allowed to stand. The solid formed was recrystallized from petroleum ether containing a little alcohol, and then from a mixture of ether and petroleum ether. A sample sublimed in a high vacuum at 80° C. and the sublimate melted at 81–83° C. Analysis gave: carbon 71.9%, hydrogen 7.0% and nitrogen 13.9%, compared to the theoretical calculated for $C_{12}H_{14}ON_2$ of carbon 71.2%, hydrogen 6.98% and nitrogen 13.81%.

EXAMPLE 34

*Di-n-propyl ketone*

Sodium (9.2 g.) was added to anhydrous ethyl alcohol (150 ml.) in a 500 ml., three-necked flask, arranged with a sealed stirrer, an oil bath, and a fractionating column. After the reaction was complete the alcohol was vacuum distilled out until only a little remained. Then diethyl carbonate (300 ml.) was added and all of the remaining alcohol was fractionally distilled out at reduced pressure. The bath temperature was arranged at 100–110° C. and the pressure at 150 mm. and di-n-propyl ketone (46 g.) was added. During three hours there was fractionally distilled out 45 cc. of distillate at 45–50° C., head temperature, consisting mostly of alcohol. The mixture was cooled and decomposed with acetic acid and water. The oil was washed free of acid with water, dried, and fractionated. There was obtained a 44% (34 g.) yield of ethyl 2-ethyl-3-keto-hexanoate, boiling point 126–127° C. at 34 mm., $n\ 31/D\ 1.4224$–$1.4226$. This compound was identified by reacting it with hydrazine to prepare 4-ethyl-3-propyl-pyrazolone-5, which melted at 163–165° C.

Example 35

Methyl isobutyl ketone

A mixture was made of sodium ethylate (13.6 g.), diethyl carbonate (100 ml.), and ethyl alcohol (15 g.), as described in Example 32. The mixture was stirred with the flask in a bath at 10–15° C. and methyl isobutyl ketone (20 g.) was added during twenty minutes. The mixture was then warmed to 30° C. for fifteen minutes. The bath was then warmed to 100° C. and the pressure arranged at 120 mm. and all the alcohol present was fractionally distilled out during 1.5 hours. The mixture was worked up as in Example 12. There was obtained a 60% (18.5 g.) yield of ethyl 3-keto-5-methyl-hexanoate, boiling point 95–99° C. at 14 mm., $n$ 24/D 1.4260–1.4270. This compound was identified by reacting it with phenyl-hydrazine to obtain 3-isobutyl-1-phenyl-pyrazolone-5, which melted at 107–108° C.

Example 36

Pinacolone

Pinacolone (50 g.) and diethyl carbonate (300 ml.) were stirred mechanically and cooled to 2° C., while a paste of alcohol-free sodium methylate (25 g.) in about an equal amount of diethyl carbonate was added slowy. The reaction was continued and the product worked up by the procedure described in Example 33. A portion of the distillate boiling at about 90° C. at 15 mm. was combined with an equal volume of phenylhydrazine, and on the following day the solid product was recrystallized from petroleum ether containing a little anhydrous alcohol. The derivative was 3-tert-butyl-1-phenylpyrazolone-5, melting point 110–111° C., which proved that the product obtained from the main reaction was an ester of 4,4-dimethyl-3-keto-pentanoic acid.

Example 37

Methyl n-amyl ketone

Methyl n-amyl ketone (57 g.) and diethyl carbonate (500 ml.) were placed in a 1 liter, three-necked flask fitted with a mechanical stirrer, dropping funnel and fractionating column arranged for distillation at reduced pressure. The reactants were stirred and refluxed under a pressure of 100 mm., while a solution of sodium ethylate made from sodium metal (11.5 g.) and anhydrous alcohol (270 ml.) was added slowly from the dropping funnel. Alcohol was removed simultaneously as distillate at the head of the column at about 38° C at 100 mm. When no more alcohol was obtainable as distillate the reaction mixture was cooled and agitated with ice and excess hydrochloric acid. The organic layer was separated, washed free of acid, and dried over calcium chloride. After removing the excess diethyl carbonate by distillation, the product, ethyl 3-keto-octanoate, distilled at about 123–126° C. at 19 mm., and the index of refraction was about $n$ 20/D 1.4333 to 1.4340. The yield was 61.2 g., or 65% of the theoretical.

The identity of the product was established by converting a sample to 3-n-amyl-1-phenylpyrazolone-5-by reaction with phenylhdyrazine. The product after recrystallization from 50% alcohol, melted at 95–96° C.

3-n-amyl-1-p-nitrophenyl-pyrazolone-5 was prepared by combining a sample of the ester (1 cc.) with p-nitrophenylhydrazine hydrochloride (1 g.) and 50% alcohol (15 ml.). On standing, the product crystallized and was purified by recrystallization from 50% alcohol. It melted at 113–115° C.

Example 38

Methyl neopentyl ketone

Sodium (4.6 g.) was added to anhydrous ethyl alcohol (100 ml.) in a 500 ml., three-necked flask arranged with a sealed stirrer, an oil bath and a fractionating column. After the reaction was complete, the excess alcohol was vacuum distilled out until only 25 g. of alcohol remained. The mixture was cooled and diethyl carbonate (125 ml.) was added. The cake of sodium ethylate was broken up by stirring until an even suspension resulted. The mixture was cooled to room temperature and methyl neopentyl ketone (23 g.) was added with stirring. The mixture was stirred ten minutes and then the bath was warmed to 50° C. and the sodium ethylate went slowly into solution. The alcohol present was fractionally distilled out at a bath temperature of 100–110° C. and a pressure of 120 mm. during 2.5 hours. The mixture was then cooled and worked up as in Example 32. There was obtained a 66% (24.5 g.) yield of ethyl 3-keto-5,5-dimethyl-hexanoate, boiling point 104–105° C. at 14–15 mm., $n$ 24/D 1.4333–1.4335. The product was analyzed and found to contain 64.5% carbon (theory 64.4%) and 10.1% hydrogen (theory 9.7%). The product was reacted with phenylhydrazine to give a solid derivative, melting at 138–140° C., which was found by assay to contain 12.1% nitrogen. This compound, 3-neopentyl-1-phenyl-pyrazolone-5, has a theoretical nitrogen content of 12.2%.

Example 39

Methyl n-hexyl ketone

Di-n-propyl carbonate (210 g.) and methyl n-hexyl ketone (48 g.) were placed in a 500 ml., three-necked flask, fitted with a fractionating column, a dropping funnel, and a mechanical stirrer. A solution of potassium propylate, made from potassium metal (13.5 g.) and n-propyl alcohol (150 ml.), was placed in the dropping funnel. The reaction mixture was brought to refluxing under the column at a pressure of 100 mm. and the solution of potassium propylate was added gradually during 3.5 hours. Simultaneously, propyl alcohol was removed as distillate at the head of the column at a temperature of about 51–54° C. at 100 mm. pressure. When no more propyl alcohol was obtainable as distillate the temperature rose rapidly to about 100–102° C. at 100 mm. and di-propyl carbonate distilled. The residue was cooled, acidified with acetic acid, agitated with ice water, and the oil was extracted with ether. The ether extract was dried over calcium chloride and distilled, yielding n-propyl 3-keto-nonanoate. The product boiled at 120–122° C. at 3 mm. and its index was $n$ 21/D 1.4370 to 1.4382. The yield was 52.9 g., or 74% of the theoretical based on methyl n-hexyl ketone.

The identity of the product was established by allowing a sample to react with phenylhydrazine, yielding 1-phenyl-3-n-hexyl-pyrazolone-5, which melted at 83–84° C.

Example 40

Acetone

Dry diethyl carbonate (350 ml.) and dry acetone (58 g.) were placed in a 500 cc. three-necked flask fitted with a stirrer, thermometer, and calcium chloride tube. The flask was cooled in a bath of acetone and Dry Ice to —45° C., and to the stirred mixture sodium methylate (54 g.) was slowly added in small portions. Initial additions of sodium methylate produced an exothermic reaction. It appeared that the sodium methylate had caused considerable condensation of the acetone, so more acetone (29 g.) was added. The temperature of reaction was allowed to rise slowly and at about 15° C. another exothermic reaction was observed, accompanied by a thickening of the reaction mixture.

After standing overnight the mixture was acidified with acetic acid and stirred with ice. The organic layer was separated and the aqueous phase was extracted with ether and the extract was added to the organic layer. After drying, the ether and diethyl carbonate were carefully stripped off and the residue was fractionated. Ten fractions were obtained, amounting to 48 g., boiling from 55° at 50 mm. to 120° C. at 2 mm., and varying progressively from $n$ 17/D 1.4010 to 1.5251.

It is well known that alkaline agents cause a variety of condensation reactions with acetone, but products containing carboxyl or carbalkoxyl groups are not produced by such condensation reactions.

The fractions described above were therefore subjected to saponification to determine whether carbalkoxylation had taken place, in addition to the expected condensations. A fraction boiling at 80° to 85° C. at 50 mm., of $n$ 17/D 1.4165, was combined with the next successive fraction, which boiled up to 40° C. at 2 mm., $n$ 17/D 1.4200. The saponification equivalent was determined by conventional procedures and was found to be 221. This indicated that carbalkoxylation had taken place. The higher boiling fractions also gave evidence of carbalkoxylation, but in smaller proportion. Thus, saponification equivalents of 530 and 604 were found for subsequent fractions.

EXAMPLE 41

Phenylacetonitrile

Sodium (4.7 g.) was added to anhydrous ethyl alcohol (100 ml.) in a 500 ml., three-necked flask, attached to a fractionating column. When the reaction was complete the flask was heated with an oil bath at 100° C. and the pressure was arranged at 120 mm. for ¾ hour to distill out most of the excess alcohol. The mixture was cooled to 30° C. and diethyl carbonate (125 ml.) was added. Then the distillation was continued at a bath temperature of 70° C. and a pressure of 50 mm. until only 30 ml. of alcohol remained in the mixture.

The mixture was cooled and phenylacetonitrile (23.4 g.) was added in portions with thorough shaking. After fifteen minutes, the flask was again attached to the column and was heated with the oil bath to 80–100° C. The pressure was reduced to 120 mm. and during two hours ethyl alcohol (44 ml.) was fractionated out. The mixture was then cooled and decomposed with acetic acid and water. The organic layer was separated, washed free of acid, dried and then fractionated. A yield of 78% (29 g.) of ethyl alpha-cyanophenylacetate, boiling point 125–126° C. at 2–3 mm., and $n$ 24/D 1.5017, was obtained. The ester was identified by reacting it with ammonia to obtain alpha-cyanophenylacetamide, which melted at 148–149° C., and by nitrogen assay, which showed 7.6% (theory 7.4%).

EXAMPLE 42 p-Methylphenylacetonitrile

Sodium (6.7 g.) was added to anhydrous ethyl alcohol (150 ml.) in a 500 ml., three-necked flask, arranged with a sealed stirrer, an oil bath and a fractionating column. When the reaction was complete the bath was heated to 90–100° C. and the pressure was reduced to 150 mm., and alcohol (80 ml.) was distilled out. The flask was then cooled and diethyl carbonate (250 ml.) was added. The distillation was then continued as above until all of the alcohol had been fractionated out. The mixture was cooled and p-methylphenylacetonitrile (37 g.) was added during one-half hour. During the addition the flask was cooled with a water bath at 20° C. and the mixture was stirred.

The flask was then heated with an oil bath at 90° C. and the pressure was reduced to 150 mm., and during 1½ hours a distillate (43 cc.), mostly alcohol, was fractionated out. The mixture was cooled and worked up as in Example 41. A yield of 87% (48 g.) of ethyl alpha-cyano-p-methylphenylacetate, boiling point 120–121° C. at 1 mm., and $n$ 20.5/D 1.5046–1.5048, was obtained. This compound was identified by analysis; found, carbon 70.9% (theory 70.8%), hydrogen 6.5% (theory 6.4%) and nitrogen 7.0% (theory 6.9%). By reacting it with ammonia there was obtained alpha-cyano-p-methylphenylacetamide, melting at 167–168° C.

EXAMPLE 43 p-Iodophenylacetonitrile

A mixture was made of sodium ethylate (13.6 g.) and diethyl carbonate (250 ml.) as described in Example 42. The mixture was stirred and, at 50° C., a solution of p-iodophenylacetonitrile (48 g.) in diethyl carbonate (50 ml.) was added. The bath was heated at 100–110° C. and the pressure was arranged at 150 mm., and during two hours there was fractionated out 25 ml. of distillate, mostly alcohol. The mixture was worked up as described in Example 41. A yield of 50% (35 g.) of ethyl alpha-cyano-p-iodophenylacetate, boiling point 160° C. at 2 mm., was obtained. It was identified by iodine and nitrogen assays; found 40.5% iodine (theory 40.3%) and 4.4% nitrogen (theory 4.4%).

EXAMPLE 44

Acetonitrile

A mixture was made of sodium ethylate (34 g.) and diethyl carbonate (300 ml.) as described in Example 42. The mixture was cooled to room temperature, and acetonitrile (21 g.) was added. The bath was heated to 140–160° C. and ethyl alcohol (80 ml.) was fractionated out during 1½ hours. The mixture was then cooled and ether (300 ml.) was added. A fine, granular solid readily settled out of the suspension. The liquor was decanted. The solid was washed twice by decantation with 300 ml. portions of ether. The solid was then suspended in ether and concentrated hydrochloric acid (32 ml.) was added in small portions with shaking. After thorough shaking the ether solution was decanted and filtered, dried with sodium sulfate and filtered again. The ether was distilled off on the steam bath and the residue was vacuum fractionated. A yield of 10% (5 g.) of ethyl cyanoacetate, boiling point 106–107° C. at 22 mm., was obtained. This product was identified by reacting it with ammonia to form cyanoacetamide, which melted at 119–121° C.

EXAMPLE 45

Butyronitrile

A mixture was made of sodium ethylate (24.5 g.) and diethyl carbonate (300 ml.) as described in Example 42. The mixture was stirred and, at 80° C., butyronitrile (25 g.) was added. The bath was heated to 150–155° C. and the mixture was refluxed in the column for fifteen minutes. Then, during three hours, alcohol (35 ml.) was slowly fractionated out. The mixture was then cooled and worked up as described in Example 41. A yield of 43% (22 g.) of ethyl alpha-cyanobutyrate, boiling point 109–110° C. at 24 mm., $n$ 20/D 1.4174–1.486, was obtained. This compound was identified by hydrolyzing it to obtain ethylmalonic acid, which melted at 112–113° C.

EXAMPLE 46

Isovaleronitrile

A mixture was made of sodium ethylate (29.9 g.) and diethyl carbonate (300 ml.) as described in Example 42. The mixture was stirred and, at 30° C., isovaleronitrile (35 g.) was added. The bath was heated to 150–155° C. and, during 3.5 hours, alcohol (43 ml.) was fractionally distilled out. The mixture was cooled and worked up as described in Example 41. A yield of 47% (31 g.) of ethyl alpha-cyano-isovalerate, boiling point 111–113° C. at 22 mm., $n$ 20/D 1.4215–1.4230, was obtained. This compound was identified by hydrolyzing it to obtain isopropylmalonic acid, which melted at 85–88° C.

EXAMPLE 47

Capronitrile

A mixture was made of sodium ethylate (34 g.) and diethyl carbonate (300 ml.) as described in Example 42. The bath temperature was raised to 150–155° C. and, during one hour, capronitrile (47.5 g.) was added. After one-half hour of the addition the fractional distillation of alcohol was started. During the total distillation period of 3½ hours, 60 ml. of alcohol was obtained. Then the mixture was cooled and worked up as in Example 41. There was obtained a 54% (41 g.) yield of ethyl alpha-cyanocaproate, boiling point 128–129° C. at 23 mm. This product was identified by hydrolyzing it to obtain n-butylmalonic acid, which melted at 102–103° C.

EXAMPLE 48

Iso-capronitrile

Potassium (20 g.) was dissolved in n-propyl alcohol (125 ml.) in a 500 ml. three-necked flask. Excess propyl alcohol was distilled off and the residue was heated at reduced pressure until the potassium propylate was substantially free of alcohol. After cooling, di-n-propyl carbonate (350 ml.) and iso-capronitrile (49 g.) were added and the flask was fitted with a mechanical stirrer and connected to a packed column arranged for distillation under reduced pressure. The reaction mixture was stirred and heated and propyl alcohol was removed as distillate at the head of the column at 51–54° C. at 100 mm.

When no more propyl alcohol was obtainable as distillate the reaction mixture was cooled and poured onto ice and acetic acid (35 ml.). The organic layer was separated, washed with water, dried over calcium chloride and distilled through an indented column at reduced pressure. After removing excess dipropyl carbonate the product, n-propyl alpha-cyano-iso-caproate, was obtained boiling at about 78–80° C. at 1.5 mm. The index of refraction was about $n$ 25/D 1.4262. The yield was 66 g., or 72% of the theoretical based on iso-capronitrile.

The identity of the product was established by ammonolysis to alpha-cyano-iso-caproamide. A sample of the product (2 ml.) was shaken with concentrated ammonia (5 ml.) and a little alcohol. After two days the reaction mixture was diluted with water and extracted with ether. The ether extract was evaporated to dryness and the residue was recrystallized from petroleum ether, yielding plates of alpha-cyano-iso-caproamide, melting point 101–103° C.

EXAMPLE 49

Stearonitrile

Sodium (4 g.) was dissolved in anhydrous ethyl alcohol (100 ml.) in a 500 ml., three-necked flask. Excess alcohol was distilled off and the residue of sodium ethylate was heated at about 130° C. and at a pressure of about 30 mm. until the sodium ethylate was substantially free of alcohol. After cooling, diethyl carbonate (250 ml.) and commercial stearonitrile (40 g.) were added and the flask was fitted with a mechanical stirrer and attached to a packed fractionating column. The reaction mixture was stirred and refluxed at atmospheric pressure and alcohol was removed as distillate at the head of the column. When no more alcohol was obtainable, the reaction mixture was cooled, acidified with acetic acid (12 ml.) and poured into ice water. The organic layer was separated, washed with water, dried and distilled. After the excess diethyl carbonate had been removed the product was distilled from a Claisen flask at reduced pressure. Ethyl alpha-cyanostearate (36.7 g.) distilled chiefly at 167–180° C. at 2 mm., and its melting point was about 14–18° C. The index of refraction of the liquid was about $n$ 27/D 1.4460.

The identity of the product was established by hydrolyzing a 10 g. sample with a solution of potassium hydroxide (2 g.) in alcohol (40 ml.) at room temperature. After about an hour the reaction mixture was diluted with water and extracted with ether. The aqueous phase was acidified with excess hydrochloric acid and extracted with ether. The ether extract was evaporated to dryness and the residue was crystallized from a mixture of acetic acid and petroleum ether, yielding alpha-cyanostearic acid, melting point 82–83° C.

Carrying out the above carbalkoxylation reactions without the simultaneous removal by distillation of the alcohol produced in the reaction is entirely feasible, but the yield is somewhat decreased.

It will be noted that several different procedures are utilized in carrying out the foregoing examples. Any of the procedures employed may be utilized in carrying out any particular reaction; for example, the dialkyl carbonate and the compound to be carbalkoxylated may be placed in a flask under a reflux, and the metal alcoholate gradually dropped in, or the dialkyl carbonate and the alcoholate may be placed in a flask and the compound to be carbalkoxylated dropped in. In either instance, the alcohol is preferably taken off as a distillate at the head of the column.

The alkali metals themselves are unsuitable substitutes for the metal alcoholates employed in carrying out the present invention. These alkali metals react with and decompose the dialkyl carbonate.

The foregoing reactions may be carried out at atmospheric, or under reduced pressure. The selection of operating pressures is determined merely by manipulative convenience, in most instances.

In general, it is preferred that the alkyl carbonate and the metal alcoholate shall contain the same alkyl groups in order to be certain that a mixture of products will not be obtained.

In view of the above it will be seen that the several objects of the invention are achieved and other advantageous results attained.

As many changes could be made in the above processes and products without departing from the scope of the invention, it is intended that all matter contained in the above description shall be interpreted as illustrative and not in a limiting sense.

We claim:

1. A process for simultaneously carbalkoxylating and metallating an organic compound of the type:

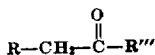

where R is selected from the group consisting of hydrogen and monovalent hydrocarbon radicals, and R''' is a monovalent radical selected from the group consisting of hydrocarbon radicals directly attached and hydrocarbon radicals attached through oxygen, which comprises mixing said compound with an anhydrous alkali metal alcoholate and a large excess of a dialkyl carbonate over that required as a reactant, whereby one of the hydrogens of the CH₂ group is replaced by a carbalkoxyl group and the other hydrogen is replaced by an alkali metal.

2. A process for simultaneously carbalkoxylating and metallating an organic compound of the type:

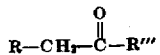

where R is selected from the group consisting of hydrogen and monovalent hydrocarbon radicals, and R''' is a monovalent radical selected from the group consisting of hydrocarbon radicals directly attached and hydrocarbon radicals attached through oxygen, which comprises mixing said compound with an anhydrous alcohol-free alkali metal alcoholate, and a dialkyl carbonate in quantity sufficient to function as reagent and reaction medium, whereby one of the hydrogens of the CH₂ group is replaced by a carbalkoxyl group and the other hydrogen is replaced by an alkali metal, and removing alcohol.

3. A process for simultaneously carbalkoxylating and metallating an organic compound of the type:

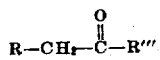

where R is selected from the group consisting of hydrogen and monovalent hydrocarbon radicals, and R''' is a monovalent radical selected from the group consisting of hydrocarbon radicals directly attached and hydrocarbon radicals attached through oxygen, which comprises mixing and heating said compound with an anhydrous alcohol-free alkali metal alcoholate and a large excess of a dialkyl carbonate, the quantity thereof being sufficient to function as reagent and as reaction medium, and continuously removing alcohol from the reaction mixture, whereby one of the hydrogens of the CH₂ group is replaced by a carbalkoxyl group and the other hydrogen is replaced by an alkali metal.

4. A process for simultaneously carbalkoxylating and metallating an organic compound of the type:

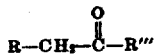

where R is selected from the group consisting of hydrogen and monovalent hydrocarbon radicals, and R''' is a monovalent radical selected from the group consisting of hydrocarbon radicals directly attached and hydrocarbon radicals attached through oxygen, which comprises mixing said compound with an anhydrous alkali metal alcoholate and a large excess of a dialkyl carbonate over that required as a reactant, and continuously subjecting the mixture to distillation for removing alcohol from the reaction mixture, whereby one of the hydrogens of the CH₂ group is replaced by a carbalkoxyl group and the other hydrogen is replaced by an alkali metal.

5. A process for simultaneously carbalkoxylating and metallating an organic compound of the type:

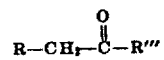

where R is selected from the group consisting of hydrogen and monovalent hydrocarbon radicals, and R''' is a monovalent radical selected from the group consisting of hydrocarbon radicals directly attached and hydrocarbon radicals attached through oxygen, which comprises mixing said compound with an anhydrous alcohol-free alkali metal alcoholate of a lower alcohol and a large excess of a dialkyl carbonate having lower alkyl groups, the quantity of said carbonate being sufficient to provide reagent and reaction medium, and continuously subjecting the mixture to distillation for removing alcohol from the reaction mixture, whereby one of the hydrogens of the CH₂ group is replaced by a carbalkoxyl group and the other hydrogen is replaced by an alkali metal.

6. A process for simultaneously carbalkoxylating and metallating a fatty acid ester which comprises mixing and heating said ester with an anhydrous alkali metal alcoholate and a large excess of a dialkyl carbonate over that required as a reactant.

7. A process for simultaneously carbalkoxylating and metallating ethyl butyrate which comprises mixing and heating said compound with anhydrous sodium ethylate and a large excess of diethyl carbonate, the quantity thereof being sufficient to function as reagent and as reaction medium.

8. A process for simultaneously carbalkoxylating and metallating ethyl stearate which comprises mixing and heating said compound with anhydrous sodium ethylate and a large excess of diethyl carbonate, the quantity thereof being sufficient to function as reagent and as reaction medium.

9. The process for simultaneously carbalkoxylating and metallating ethyl caproate which comprises mixing and heating said compound with anhydrous sodium ethylate and a large excess of a diethyl carbonate, the quantity thereof being sufficient to function as reagent and as reaction medium.

10. A process for simultaneously carbalkoxylating and metallating ethyl butyrate which comprises mixing and heating said compound with anhydrous alcohol-free sodium ethylate and a large excess of diethyl carbonate, the quantity thereof being sufficient to function as reagent and as reaction medium, and continuously subjecting the mixture to distillation for removing alcohol formed by the reaction.

11. The process for simultaneously carbalkoxylating and metallating ethyl stearate which comprises mixing and heating said compound with anhydrous alcohol-free sodium ethylate and a large excess of diethyl carbonate, the quantity thereof being sufficient to function as reagent and as reaction medium, and continuously subjecting the mixture to distillation for removing alcohol formed by the reaction.

12. The process for simultaneously carbalkoxylating and metallating ethyl caproate which comprises mixing and heating said compound with anhydrous alcohol-free sodium ethylate and a large excess of a diethyl carbonate, the quantity thereof being sufficient to function as reagent and as reaction medium, and continuously subjecting the mixture to distillation for removing alcohol formed by the reaction.

VERNON H. WALLINGFORD.
AUGUST H. HOMEYER.

---

Certificate of Correction

Patent No. 2,367,632.      January 16, 1945.

VERNON H. WALLINGFORD ET AL.

It is hereby certified that error appears in the printed specification of the above numbered patent requiring correction as follows: Page 11, first column, line 18, for "1.4174–1.486" read $1.4174$–$1.4186$; and that the said Letters Patent should be read with this correction therein that the same may conform to the record of the case in the Patent Office.

Signed and sealed this 26th day of August, A. D. 1947.

[SEAL]

LESLIE FRAZER,
*First Assistant Commissioner of Patents.* being sufficient to function as reagent and as reaction medium.

10. A process for simultaneously carbalkoxylating and metallating ethyl butyrate which comprises mixing and heating said compound with anhydrous alcohol-free sodium ethylate and a large excess of diethyl carbonate, the quantity thereof being sufficient to function as reagent and as reaction medium, and continuously subjecting the mixture to distillation for removing alcohol formed by the reaction.

11. The process for simultaneously carbalkoxylating and metallating ethyl stearate which comprises mixing and heating said compound with anhydrous alcohol-free sodium ethylate and a large excess of diethyl carbonate, the quantity thereof being sufficient to function as reagent and as reaction medium, and continuously subjecting the mixture to distillation for removing alcohol formed by the reaction.

12. The process for simultaneously carbalkoxylating and metallating ethyl caproate which comprises mixing and heating said compound with anhydrous alcohol-free sodium ethylate and a large excess of a diethyl carbonate, the quantity thereof being sufficient to function as reagent and as reaction medium, and continuously subjecting the mixture to distillation for removing alcohol formed by the reaction.

VERNON H. WALLINGFORD.
AUGUST H. HOMEYER.

Certificate of Correction

Patent No. 2,367,632.      January 16, 1945.

VERNON H. WALLINGFORD ET AL.

It is hereby certified that error appears in the printed specification of the above numbered patent requiring correction as follows: Page 11, first column, line 18, for "1.4174–1.486" read $1.4174$–$1.4186$; and that the said Letters Patent should be read with this correction therein that the same may conform to the record of the case in the Patent Office.

Signed and sealed this 26th day of August, A. D. 1947.

[SEAL]

LESLIE FRAZER,
*First Assistant Commissioner of Patents.*